Feb. 3, 1925.
C. BOUILLON
HEADSTOCK CONSTRUCTION
Filed Oct. 15, 1921
1,525,265
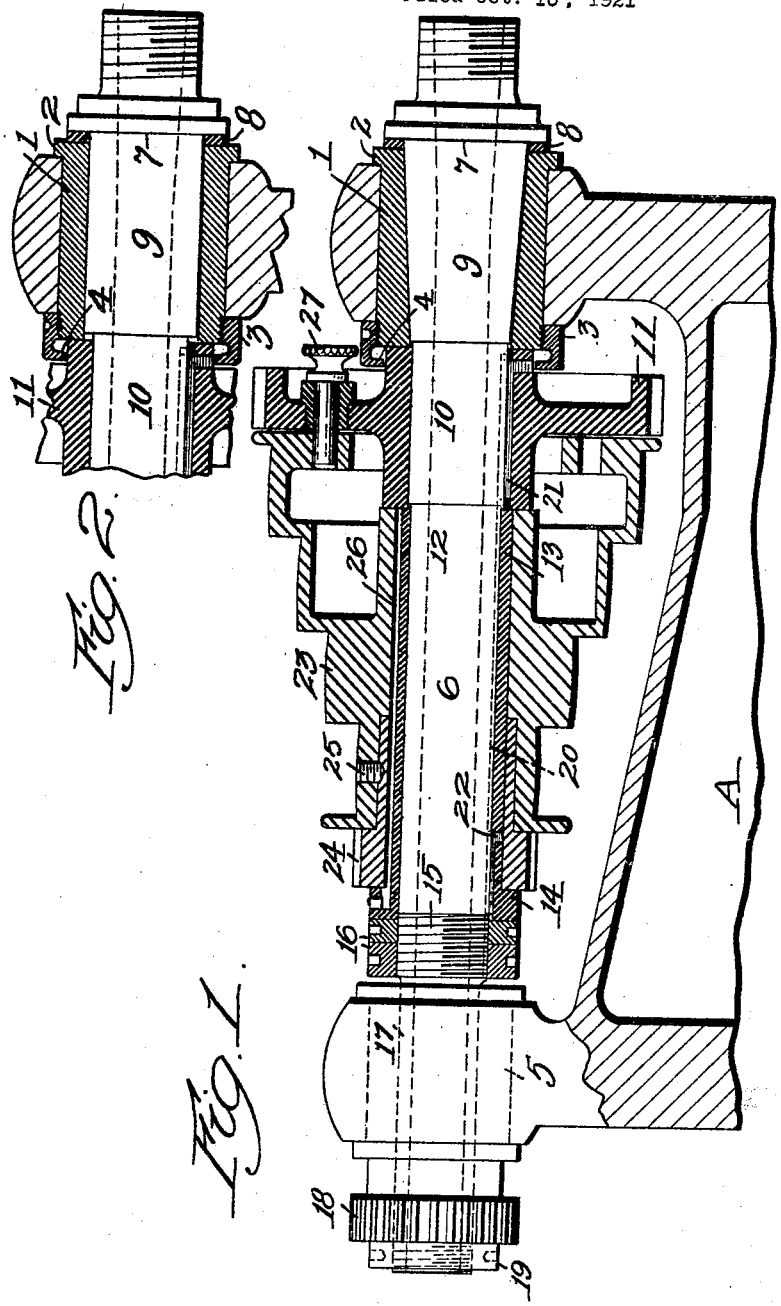
Inventor
Constant Bouillon Patented Feb. 3, 1925.

1,525,265

UNITED STATES PATENT OFFICE.

CONSTANT BOUILLON, OF TORRINGTON, CONNECTICUT, ASSIGNOR TO HENDEY MACHINE COMPANY, OF TORRINGTON, CONNECTICUT, A CORPORATION OF CONNECTICUT.

HEADSTOCK CONSTRUCTION.

Application filed October 15, 1921. Serial No. 507,839.

*To all whom it may concern:*

Be it known that I, CONSTANT BOUILLON, a citizen of the United States, residing at Torrington, in the county of Litchfield and State of Connecticut, have invented a new and useful Headstock Construction, of which the following is a specification.

The object of this invention is to improve the construction of headstocks of machine tools, such as lathes and milling machines. To this end, the invention consists of a headstock carrying the usual bearings, a spindle fitted therein, a face gear keyed or fitted to turn with the spindle but so as to permit axial adjustment between the spindle and gear, a bearing sleeve keyed or fitted to turn with the spindle but so as to permit axial adjustment between the spindle and sleeve, a driving pulley and connected pinion fitted to turn on said sleeve and means for adjusting said spindle axially. This construction is particularly adapted for use in back geared headstocks and particularly where the machine tool with such headstock is used as an instrument of precision.

The invention is illustrated in the accompanying drawing, in which—

Fig. 1 is a cross sectional elevation through a headstock constructed to embody my improvement; and Fig. 2 is a partial cross-sectional view illustrating a modified form of front bearing.

Referring to the drawing and in detail, A designates the headstock casting or block, which is provided with the usual front and rear uprights. A bearing 1 is secured or keyed in the front or right hand hub and this bearing is kept in place by a collar 2 on its right hand end and by a nut 3 threaded thereon, which nut has an extended recessed flange 4. A bearing 5 is arranged in the rear or left hand hub. The spindle is designated by 6. The spindle is usually made hollow and is bored or reamed out at its right hand end so as to receive the usual center. The spindle is made with a shoulder 7 which bears against a collar 8 arranged between said shoulder and the right hand end of the bearing 1.

The spindle then has a section 9, which is ground or finished so as to fit accurately in the bearing 1. The spindle is next made with a straight section 10, on which is placed a face gear 11, the right hand end of the hub of the face gear bearing on the left hand end of the bearing 1. The spindle is next made with a straight-section 12, fitted on which section is a bearing sleeve 13 having a collar 14 at its left-hand end. The spindle is next made with a threaded section 15 on which are threaded one or more adjusting nuts 16. The spindle is next made with a straight section 17, which is fitted in the bearing 5. A feed gear 18 is next keyed on the spindle and kept in place by a nut 19 threaded on the left hand end of the spindle.

A key-way 20 is cut through the threaded section 15 and also along through the sections 12 and 10 of the spindle 6 nearly to the shoulder between the section 10 and the section 9. A key 21 somewhat shorter in length than the hub of the face gear is fitted in the face gear 11 and in said key-way 20, said key being provided with a tit to keep it in place. The face gear 11 is thus keyed or fitted to turn with the spindle but axial adjustment is permitted between the spindle and the face gear. A key 22, provided with a tit, is fitted in the bearing sleeve 13 and in said key-way 20 so that said bearing sleeve will turn with the spindle but axial adjustment is permitted between said spindle and said sleeve.

A pulley 23 such as a cone pulley having four steps has a back gear driving pinion 24 driven therein and held in place by a screw 25 so that said pulley and pinion form one piece. This piece is placed on and is free to revolve on said sleeve 13 between the collar 14 and the left end of the face gear 11. The sleeve 13 is provided with an oil channel 26 extending its whole length and communicating with a spring covered oiler pressed into the collar 14 on the sleeve.

A connecting screw or pin 27 is arranged between the face gear 11 and the right hand face of the driving pulley 23 in the usual manner so that the driving pulley can be connected to the face gear by the insertion of said pin or so that said cone pulley can be left free to revolve by the withdrawal of said pin.

The construction described is adapted for use in a back geared headstock, that is, when the driving pulley is connected to the face gear, the back gears are thrown out and the drive of the pulley goes through to the face gear directly to the spindle and so that when the pin is removed from between the face gear and the driving pulley, the back gears are thrown in so that the drive will be connected at a reduced speed through the back gear pinion 24, and the back gears to the face gear 11 and thus to the spindle. It is not thought necessary to show the back gears as the same are well understood and commonly employed in headstocks.

The parts are assembled as illustrated in the drawing. When it is desired to adjust the spindle in its bearings the nuts 16 are turned to make such adjustment. By turning the nuts to draw the spindle to the left the section 9 of the spindle may be drawn further into the bearing 1. If the hole in this bearing is made tapered as illustrated in Fig. 1, a tighter fit is obtained by this adjustment. If this bearing is made straight as indicated in Fig. 2, the spindle will be adjusted axially to the rear or left to take up wear on the thrust collar 8. This adjustment does not affect the running freedom of the driving pulley and connected pinion on the driving sleeve, nor does it affect or bring any end pressure on the rear or left hand bearing.

The details and arrangements herein shown and described may be greatly varied by a skilled mechanic without departing from the scope of my invention as expressed in the claim.

Having thus fully described my invention what I claim and desire to secure by Letters Patent is:—

In a headstock, the combination of a front bearing and a rear bearing, a spindle having sections fitted in said bearings, a face gear keyed directly on the spindle but so as to permit axial adjustment between the spindle and gear, the hub of said face gear bearing on the end of said bearing, a bearing sleeve fitted to turn with the spindle but so as to permit axial adjustment between the spindle and sleeve one end of said sleeve bearing on the face gear, said sleeve having a collar, a driving pulley and connected pinion fitted to turn on said sleeve between said collar and face gear, and an adjusting nut or nuts threaded on said spindle, whereby said spindle can be adjusted in said front bearing without affecting the running freedom of said driving pulley and pinion on said sleeve.

In testimony whereof I have hereunto affixed my signature.

CONSTANT BOUILLON.